(12) United States Patent
Tamkivi

(10) Patent No.: US 9,716,859 B2
(45) Date of Patent: Jul. 25, 2017

(54) MOBILE VIDEO CALLS

(71) Applicant: Skype, Dublin (IE)

(72) Inventor: Sten Tamkivi, Tallinn (EE)

(73) Assignee: Skype, Dublin (IE)

( * ) Notice: Subject to any disclaimer, the term of this patent is extended or adjusted under 35 U.S.C. 154(b) by 0 days.

(21) Appl. No.: 15/167,700

(22) Filed: May 27, 2016

(65) Prior Publication Data

US 2016/0277711 A1  Sep. 22, 2016

Related U.S. Application Data

(63) Continuation of application No. 14/566,652, filed on Dec. 10, 2014, now abandoned, which is a
(Continued)

(30) Foreign Application Priority Data

Sep. 2, 2011 (GB) .................................. 1115207.1

(51) Int. Cl.
*H04N 7/14* (2006.01)
*H04M 1/725* (2006.01)
(Continued)

(52) U.S. Cl.
CPC ......... *H04N 7/147* (2013.01); *H04L 65/1083* (2013.01); *H04L 65/604* (2013.01);
(Continued)

(58) Field of Classification Search
CPC .................................................... H04N 7/147
USPC ......... 348/14.01, 14.02, 14.03, 14.08, 14.12, 348/734; 455/445, 404.1, 419, 456.3, 455/517, 550.1, 565, 569.1, 569.2;
(Continued)

(56) References Cited

U.S. PATENT DOCUMENTS 6,750,896 B2 * 6/2004 McClure ................ H04N 7/148
   348/14.01
7,068,299 B2 * 6/2006 Lemieux .................. H04N 7/15
   348/14.03
(Continued)

FOREIGN PATENT DOCUMENTS

EP  2099203  9/2009
EP  2190191  5/2010
(Continued)

OTHER PUBLICATIONS

"International Search Report and Written Opinion", Application No. PCT/US2012/053582, Feb. 22, 2013, 11 pages.
(Continued)

*Primary Examiner* — Gerald Gauthier

(57) ABSTRACT

A mobile device, and a method and computer program product for displaying a streaming video image at the mobile device during a packet based video call via a channel established over a wireless communication network, the method includes receiving a speed indication of the mobile device and sending said indication to a communication client application; and responsive to receiving said indication, the communication client application is configured to limit the amount of information in the streaming video image that is supplied for display on a display of the mobile device during the video.

20 Claims, 10 Drawing Sheets

Related U.S. Application Data continuation-in-part of application No. 13/341,642, filed on Dec. 30, 2011, now Pat. No. 8,913,100.

(51) Int. Cl.
*H04L 29/06* (2006.01)
*H04W 4/02* (2009.01)
*H04W 4/04* (2009.01)

(52) U.S. Cl.
CPC ... *H04M 1/72569* (2013.01); *H04M 1/72577* (2013.01); *H04N 7/141* (2013.01); *H04W 4/027* (2013.01); *H04N 2007/145* (2013.01); *H04W 4/046* (2013.01)

(58) Field of Classification Search
USPC ........ 725/32, 109; 340/466, 686.1; 370/338; 375/240.03, 240.25; 425/426.1; 701/36, 701/411; 704/275; 709/223; 715/758
See application file for complete search history.

(56) References Cited

U.S. PATENT DOCUMENTS

| | | |
|---|---|---|
| 7,221,386 B2 | 5/2007 | Thacher et al. |
| 7,398,099 B2 | 7/2008 | Brouwer |
| 7,675,538 B2* | 3/2010 | Schrader ............... H04N 7/15 348/14.01 |
| 7,688,364 B2 | 3/2010 | LeGall et al. |
| 7,880,776 B2 | 2/2011 | LeGall et al. |
| 7,895,629 B1 | 2/2011 | Shen et al. |
| 7,916,166 B1 | 3/2011 | Habib et al. |
| 7,930,409 B2 | 4/2011 | Shitrit |
| 8,208,000 B1 | 6/2012 | Swanson et al. |
| 8,259,565 B2 | 9/2012 | Yang et al. |
| 8,310,537 B2 | 11/2012 | Marti et al. |
| 8,384,555 B2 | 2/2013 | Rosen |
| 8,395,522 B2 | 3/2013 | Kweon |
| 8,432,430 B2* | 4/2013 | Jun ..................... H04N 5/247 348/14.01 |
| 8,527,013 B2 | 9/2013 | Guba et al. |
| 8,555,179 B2 | 10/2013 | Lee et al. |
| 8,594,065 B2 | 11/2013 | Polito et al. |
| 8,594,705 B2 | 11/2013 | Osann |
| 8,625,662 B2 | 1/2014 | Karaoguz et al. |
| 8,634,816 B2 | 1/2014 | Xiao et al. |
| 8,634,826 B1 | 1/2014 | Cope et al. |
| 8,639,234 B2 | 1/2014 | Sumcad et al. |
| 8,639,518 B2 | 1/2014 | Wakaki et al. |
| 8,676,268 B2 | 3/2014 | Riggs et al. |
| 8,723,913 B2 | 5/2014 | Lau et al. |
| 8,761,821 B2 | 6/2014 | Tibbitts et al. |
| 8,811,938 B2 | 8/2014 | Paek et al. |
| 8,838,082 B2 | 9/2014 | Vendrow et al. |
| 8,855,923 B2 | 10/2014 | Haavasoja |
| 8,891,023 B2 | 11/2014 | Hasegawa et al. |
| 8,913,100 B2* | 12/2014 | Tamkivi ............... H04W 4/027 345/2.3 |
| 9,125,018 B2 | 9/2015 | Wachter et al. |
| 9,160,969 B2 | 10/2015 | Swanson et al. |
| 9,179,297 B2 | 11/2015 | Osann |
| 2003/0028535 A1* | 2/2003 | Sheldon ............... H04L 12/4625 |
| 2003/0071890 A1* | 4/2003 | McClure ............... H04N 7/148 348/14.03 |
| 2003/0081110 A1* | 5/2003 | Lemieux .............. H04N 7/15 348/14.01 |
| 2003/0174771 A1 | 9/2003 | Sugahara et al. |
| 2005/0277421 A1* | 12/2005 | Ng ..................... G08B 13/19621 455/445 |
| 2006/0012672 A1* | 1/2006 | Schrader .............. H04N 7/15 348/14.08 |
| 2008/0112481 A1* | 5/2008 | Hsaing ................. H04N 19/50 375/240.03 |
| 2008/0130757 A1* | 6/2008 | Trandel .......... H04N 21/234327 375/240.25 |
| 2008/0266378 A1* | 10/2008 | Ryu ..................... H04L 12/1831 348/14.02 |
| 2009/0002147 A1 | 1/2009 | Bloebaum et al. |
| 2010/0062788 A1 | 3/2010 | Nagorniak |
| 2010/0122283 A1* | 5/2010 | Button .............. G06Q 30/0601 725/32 |
| 2010/0216509 A1 | 8/2010 | Riemer et al. |
| 2010/0332635 A1* | 12/2010 | Rogel ................. G06F 9/45533 709/223 |
| 2011/0021234 A1 | 1/2011 | Tibbitts et al. |
| 2011/0053506 A1 | 3/2011 | Lemke et al. |
| 2011/0085015 A1* | 4/2011 | Jun ........................ H04N 5/247 348/14.01 |
| 2011/0093605 A1 | 4/2011 | Choudhury et al. |
| 2011/0208545 A1 | 8/2011 | Kuester |
| 2011/0261143 A1 | 10/2011 | Ponsford |
| 2011/0316964 A1* | 12/2011 | Nakanishi ............. H04N 7/142 348/14.02 |
| 2011/0320583 A1 | 12/2011 | Parker et al. |
| 2012/0001843 A1 | 1/2012 | Gravino |
| 2012/0242473 A1 | 9/2012 | Choi |
| 2012/0265977 A1 | 10/2012 | Ewell, Jr. et al. |
| 2013/0055326 A1 | 2/2013 | Lu et al. |
| 2013/0057638 A1* | 3/2013 | Tamkivi ............... H04W 4/027 348/14.02 |
| 2013/0208080 A1 | 8/2013 | Lukasik et al. |
| 2015/0138300 A1 | 5/2015 | Tamkivi |

FOREIGN PATENT DOCUMENTS

| | | |
|---|---|---|
| JP | 2004180201 | 6/2004 |
| JP | 2005094136 | 7/2005 |

OTHER PUBLICATIONS

"Managing Bandwidth Usage on Polycom Video Endpoints", In Proceedings: 8X8, Inc. Configuration Guide, Version 1.1, Jul. 2011, 11 pages.

"Non-Final Office Action", U.S. Appl. No. 13/341,642, Mar. 25, 2014, 7 pages.

"Non-Final Office Action", U.S. Appl. No. 14/566,652, Oct. 27, 2015, 9 pages.

"Notice of Allowance", U.S. Appl. No. 13/341,642, Aug. 12, 2014, 6 pages.

"Notice of Allowance", U.S. Appl. No. 14/566,652, Feb. 29, 2016, 8 pages.

"Search Report", GB Application No. 1115207.1, Feb. 19, 2013, 6 pages.

Tappayuthpijarn,"Adaptive Video Streaming over a Mobile Network with TCP-Friendly Rate Control", In Proceedings of the International Conference on Wireless Communications and Mobile Computing: Connecting the World Wirelessly, Jun. 21, 2009, 5 pages.

\* cited by examiner

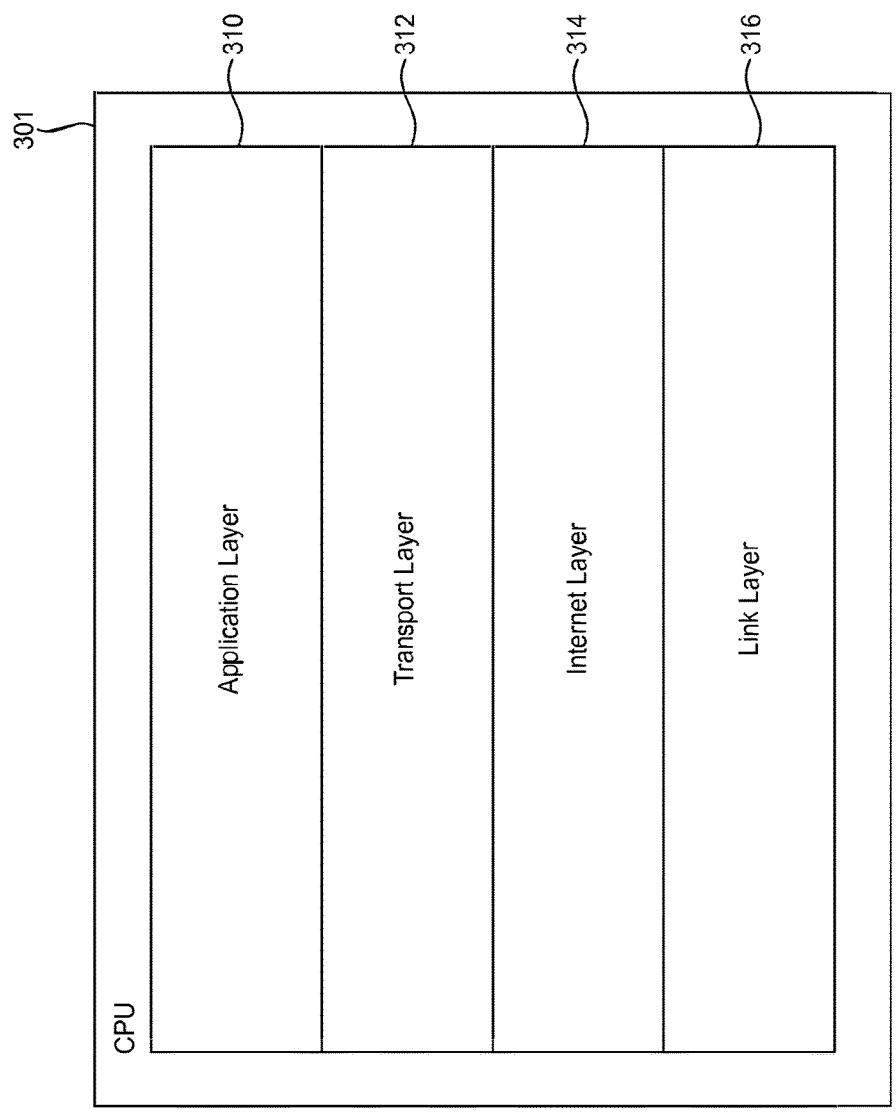

MOBILE VIDEO CALLS

RELATED APPLICATIONS

This application is a continuation of U.S. patent application Ser. No. 14/566,652 filed Dec. 10, 2014 entitled "Mobile Video Calls," which is a continuation-in-part of U.S. patent application Ser. No. 13/341,642, filed Dec. 30, 2011, entitled "Mobile Video Calls," now U.S. Pat. No. 8,913,100, granted Dec. 16, 2014, which claims priority to G.B. Patent Application No. 1115207.1 filed Sep. 2, 2011 entitled "Mobile Video Calls." The disclosures of which are contained by reference herein in their entirety.

BACKGROUND

Some communication systems allow the user of a device, such as a personal computer, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

Mobile devices are commonly used to place voice over IP calls when a user of the device is driving. Such communication is aided by use of a hands free device which enables the user to concentrate on driving whilst a voice over IP call takes place.

With increasing mobile bandwidths, there is increasing interest in providing packet-based video calls via client applications running on mobile devices such as Internet-enabled mobile phones. These mobile devices comprise transceivers such as short-range RF transceivers operating on one or more unlicensed bands for accessing the Internet via wireless access points (e.g. of Wi-Fi access points of WLAN networks), and/or cellular transceivers operating on one or more licensed bands for accessing the Internet via a packet-based service of a cellular network such as GPRS (General Packet Radio Service) or HSPA (High Speed Packet Access).

Video calls take up a large amount of device and network resource, and it is not uncommon for video calls to fail or suffer reduced quality due to insufficient resource. To date attempts to solve this problem have focused on trying to hide such issues from a user as far as possible.

SUMMARY

Various embodiments are based on a novel concept, namely to intentionally restrict video information displayed to a user in dependence on a user condition, in particular the speed of a mobile device, so as not to distract the user when driving and prevent transmitting video information unnecessarily, where it is not required.

According to one aspect there is provided a method of displaying a streaming video image at a mobile device during a packet based video call via a channel established over a wireless communication network, the method comprising: receiving a speed indication of the mobile device and sending said indication to a communication client application; and responsive to receiving said indication, the communication client application configured to limit the amount of information in the streaming video image that is supplied for display on a display means of the mobile device during the video call.

In one or more embodiments, the communication client application is configured to supply information in the streaming video image to the display means without limiting said information when the speed of the mobile device is less than the first predetermined speed threshold.

In one or more embodiments, wherein the communication client application is configured to limit the amount of information in the streaming video image by at least one of: dropping video frames of the streaming video image; reducing the display size of the streaming video image; and reducing the resolution of the streaming video image.

In one or more embodiments, the communication client application is configured to generate an indication in the display to notify a viewer that information in the streaming video image has been limited. The indication may adjust the image by (i) adding animation effects to the incoming video signal; or (ii) adding visual text and/or icons to the incoming video signal.

In one or more embodiments, the communication client application is configured to prevent display of the streaming video image when the speed of the mobile device is greater than or equal to a second predetermined speed threshold, and to limit the amount of information in the streaming video image when the speed of the mobile device is less than the second predetermined speed threshold.

In one or more embodiments, the communication client application receives state information of the mobile device, the state information used in addition to said speed indication to limit the amount of information in the streaming video image. The state information of the mobile may include at least one of a physical orientation of the mobile device, a vibration level of the mobile device, and whether an external hands free device is connected to the mobile device.

In one or more embodiments, the communication client application is configured to receive a notification of a travelling mode of operation and to limit the amount of information in the streaming video image when the mobile device is in the travelling mode of operation.

In one or more embodiments, the method further comprises presenting an option to answer the video call in the travelling mode to a user of the mobile device, the communication client application configured to receive the notification of the travelling mode responsive the user selecting the travelling mode of operation. The option to answer the video call in the travelling mode may only be presented to a user of the mobile device when the speed of the mobile device is above a predetermined speed threshold associated with the travelling mode.

In one or more embodiments, a sensor senses a physical orientation of the mobile device, wherein the travelling mode is only enabled when the speed of the mobile device is above a predetermined speed threshold associated with the travelling mode and the mobile device has a physical orientation that indicates that a user of the mobile device is not viewing the screen.

In one embodiment, the method comprises: executing the communication client application in an application layer on a processor at the mobile device; and receiving a video signal over the channel at a link layer of the mobile device; the communication client application configured to limit the information in the video signal received over the channel prior to display on said display means in the form of the streaming video image.

In this embodiment a speed detector at the mobile device receives the speed indication of the mobile device and sends the speed indication to the communication client application.

In another embodiment, the method comprises: executing the communication client application on communication processing apparatus at a remote device; the mobile device sending said indication to the communication client application over said channel; and the communication client application at the remote device configured to limit the amount of information in the video signal prior to transmission, over said channel, to the mobile device.

In this embodiment a speed detector at the mobile device detects said speed indication of the mobile device.

In one or more embodiments, the speed detector comprises a Global Positioning System (GPS) module.

In one or more embodiments, the video call is an Internet protocol-based video call.

According to a second aspect there is provided a mobile device comprising: wireless access circuitry configured to access a wireless communication network; a display; means for executing a communication client application to conduct a packet-based video call with a remote device via a channel established over the wireless communication network, said means for executing coupled to the wireless access circuitry and the display, wherein during the video call the communication client application is configured to receive, via the wireless access circuitry, a video signal transmitted over said channel from a remote device and display the video signal on said display in the form of a streaming video image; and a detector arranged to detect a speed of the mobile device and send an indication of the speed of the mobile device to the communication client application, whereby responsive to receiving said indication, the communication client application is configured to limit the amount of information in the streaming video image received over the channel prior to display on said display during the video call when the speed of the mobile device is greater than, or equal to, a first predetermined speed threshold.

According to a third aspect there is provided a mobile device comprising: wireless access circuitry configured to access a wireless communication network; a display; means for executing a communication client application to conduct a packet-based video call with a remote device via a channel established over the wireless communication network, said means for executing coupled to the wireless access circuitry; and a detector arranged to detect a speed of the mobile device and send an indication of the speed of the mobile device to the communication client application, whereby responsive to receiving said indication, the communication client application configured to transmit, via the wireless access circuitry, an indication of the speed of the mobile device to the remote device over the channel; the communication client is configured to supply to the display a streaming video image comprising information in a video signal received via the channel without limiting the information.

In one or more embodiments, the mobile device is one of: an Internet-enabled mobile telephone; a handheld game console; a personal digital assistant (PDA); a tablet computer; a laptop computer.

According to a fourth aspect there is provided a user device comprising: wireless access circuitry configured to access a wireless communication network; means for executing a communication client application to conduct a packet-based video call with a mobile device via a channel established over the wireless communication network, said means for executing coupled to the wireless access circuitry, wherein during the video call the communication client application is configured to receive, via the wireless access circuitry, an indication of a speed of the mobile device, the speed indication transmitted over said channel from the mobile device; and means for capturing video data and outputting a video signal; the communication client application is configured to generate the video signal for transmission, over said channel, to the mobile device during the video call and to limit the amount of information in the video signal generated for transmission when the speed of the mobile device is greater than, or equal to, a first predetermined speed threshold.

In one or more embodiments, the wireless communication network is the Internet.

According to a fifth aspect there is provided a computer program product for operating a mobile device comprising wireless access circuitry, a display, and communication processing apparatus, the program product comprising code embodied on a non-transitory computer readable medium and configured so as when executed on the processing apparatus to: use the wireless access circuitry to establish a packet-based video call with a remote device via a channel established over a wireless communication network and receive a video signal transmitted over said channel from a remote device and display the video signal on said display in the form of a streaming video image; use a detector to receive a speed indication of the mobile device; and limit the amount of information received in the video signal that is supplied for display on said display during a video call when the speed of the mobile device is greater than, or equal to, a first predetermined speed threshold.

According to a sixth aspect there is provided a computer program product for operating a user device comprising wireless access circuitry, means for capturing video data and communication processing apparatus, the program product comprising code embodied on a non-transitory computer readable medium and configured so as when executed on the processing apparatus to: use the wireless access circuitry to establish a packet-based video call with a mobile device via a channel established over a wireless communication network and receive via the wireless access circuitry, an indication of a speed of the mobile device, the speed indication transmitted over said channel from the mobile device; use the means for capturing video data to capture video data and output a video signal; use the wireless access circuitry to transmit the video signal over said channel to the mobile device during the video call; and limit the amount of information generated in the video signal for transmission, over the channel, when the speed of the remote device is greater than, or equal to, a first predetermined speed threshold.

Embodiments enable a mobile device to operate in a way that will prevent or reduce the risk of a driver using the device becoming distracted, or to reduce the amount of data sent to a user who is unable to clearly view the incoming video.

It will be appreciated that a user of a mobile device would become easily distracted from driving if the user must divert his attention to look at his mobile device for long periods of time whilst a video over IP call is taking place. This has serious safety implications for the safety of the driver, in particular when the user using the mobile device is travelling at high speed.

Furthermore, there is a problem in that even if a mobile device has sufficient processing and bandwidth resources to support packet-based video calling, using these resources for too long will be wasteful of battery life and/or may be expensive if the connection is charged per unit data. Packet-based video calling is therefore still restricted by the available resources when accessed through a mobile device. Furthermore, from a network operator's perspective it may still be desirable to try to avoid excessive network traffic. It is thus advantageous to restrict the amount of video data where a user cannot clearly view the incoming video.

BRIEF DESCRIPTION OF THE DRAWINGS

For a better understanding of the described embodiments and to show how it may be put into effect, reference is now made by way of example to the accompanying drawings in which:

FIG. 3a is a schematic representation of a protocol stack,

DETAILED DESCRIPTION

Figure 1:
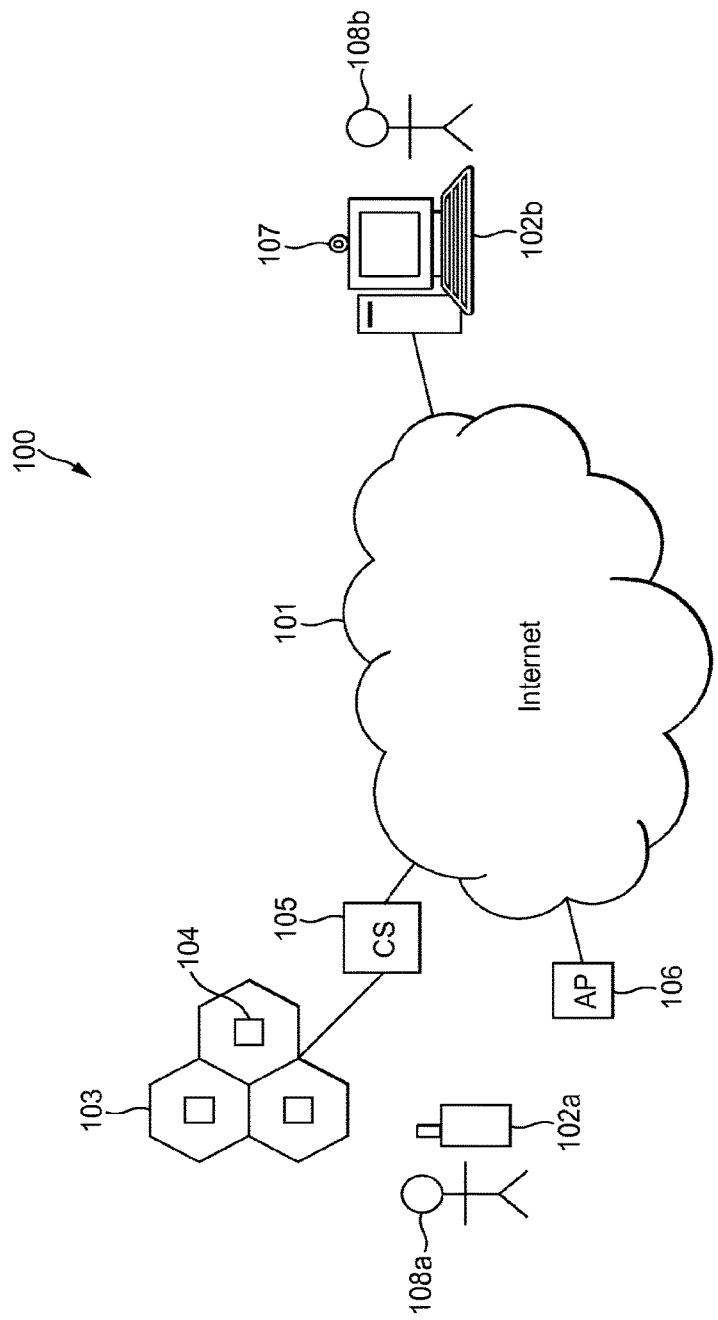
FIG. 1 is a schematic representation of a communication system.

FIG. 1 is a schematic illustration of a communication system 100 comprising a packet-based network 101 such as the Internet, and a mobile cellular network 103. The mobile cellular network 103 comprises a plurality of base stations 104 (sometimes referred to as node Bs in 3GPP terminology). Each base station 104 is arranged to serve a corresponding cell of the cellular network 103. Further, the packet-switched network 101 comprises a plurality of wireless access points 106 such as Wi-Fi access points for accessing the Internet. These may be the access points of one or more wireless local area networks (WLANs).

A plurality of user terminals 102 are arranged to communicate over the networks 101 and/or 103. At least one of the user terminals 102 comprises a mobile device such as an Internet-enabled mobile phone, and others of the user terminals 102 may comprise for example desktop or laptop PCs.

Figure 2A:
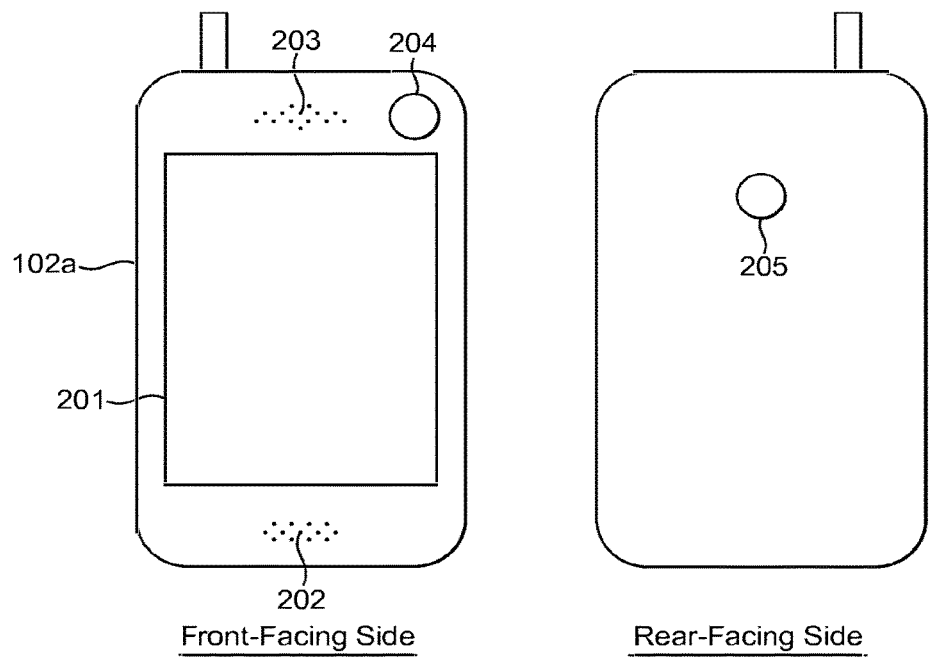
FIG. 2a is a schematic representation of a mobile terminal.
Figure 2B:
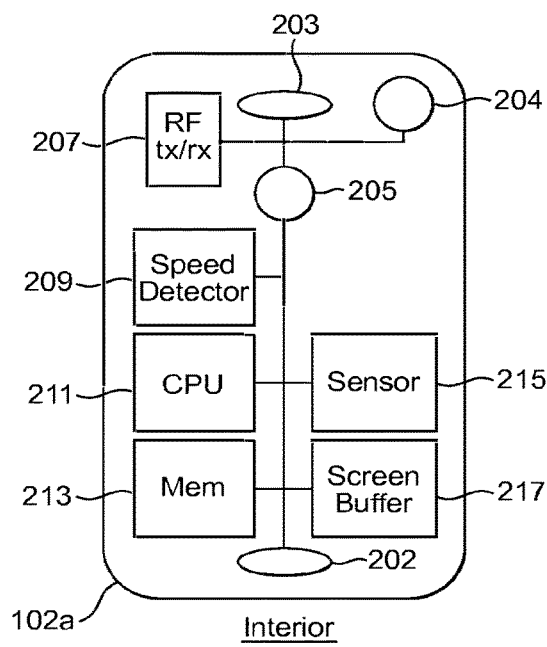
FIG. 2b is a schematic block diagram of a mobile terminal.

An example mobile device 102a is shown schematically in FIGS. 2a and 2b. The mobile device 102a comprises a processing apparatus in the form of one or more processor units (CPUs) 211 coupled to a memory 213 storing a communication client application. The processor 211 is also coupled to: an RF transceiver 207 for accessing the Internet 101, a microphone 202, a speaker 203, a screen buffer 217 for outputting video signals to the screen 201 of the device 102a, and at least one of a front-facing camera 204 facing in the same direction as the screen 201 and a rear-facing camera 205 facing on the opposite direction to the screen 201. The mobile device 102a also comprises one or more physical sensors 215 coupled to the processor 211, for sensing a state of the mobile device 102a, and a speed detector 209 for determining the speed of the mobile device, as will be discussed shortly.

Figure 2C:
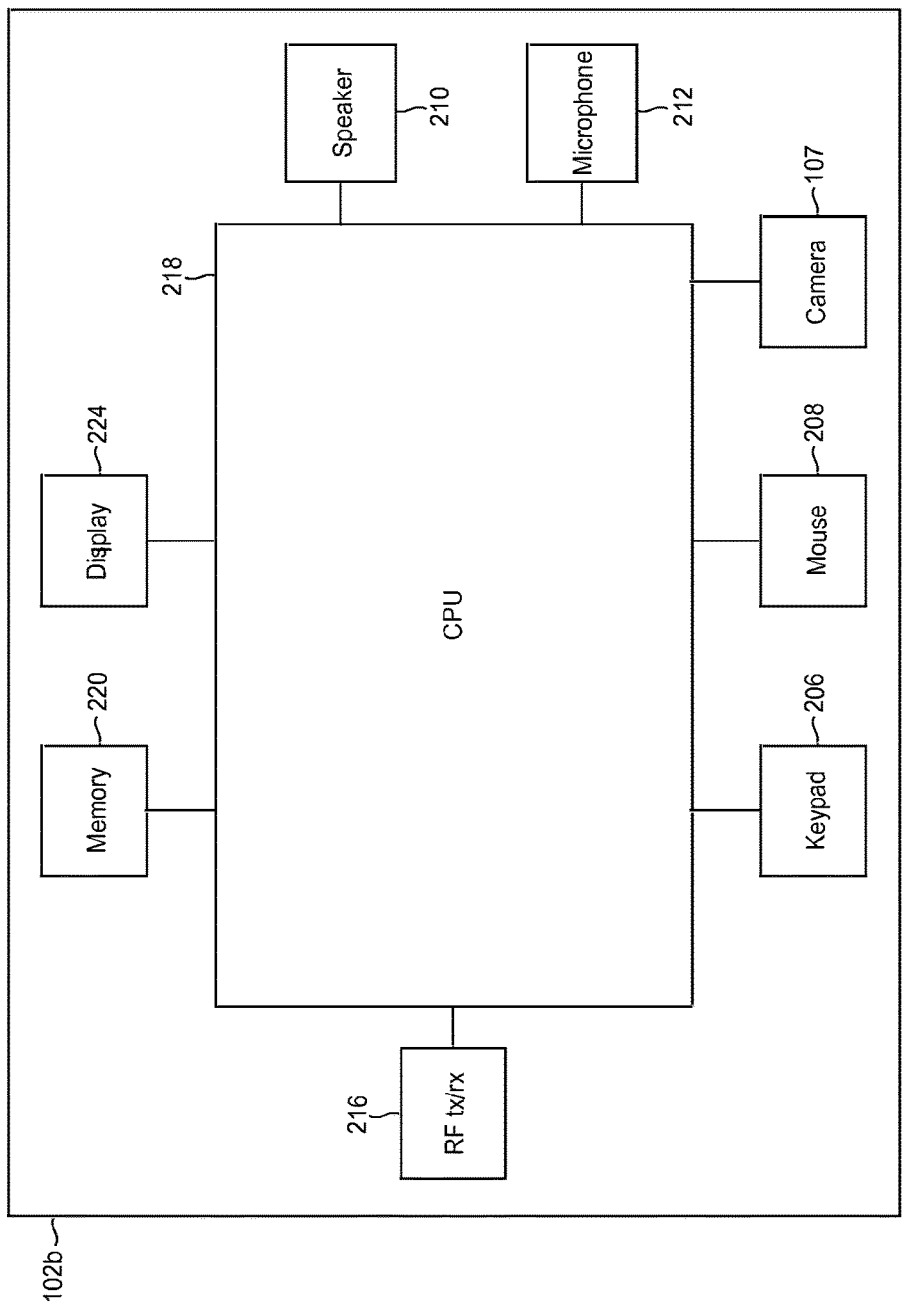
FIG. 2c is a schematic block diagram of a user terminal.

An example user terminal 102b is shown schematically in FIG. 2c. The user terminal 102b comprises a processing apparatus in the form of one or more processor units (CPUs) 218 coupled to a memory 220 storing a communication client application. The processor 218 is also coupled to an RF transceiver 216 for accessing the Internet 101 and a camera 107. The user terminal 102b may also comprise microphone 212 for receiving audio signals, a display 224 such as a screen, an input device such as a keyboard 206 or mouse 208, and an output device such as a speaker 210.

Each user terminal 102 comprises one or more transceivers 207,216 for accessing the one or more networks 101 and/or 103. For example, each user terminal 102 may comprise a cellular wireless transceiver for accessing the mobile cellular network 103 via the base stations 104, and/or a wired or wireless modem for accessing the Internet 101. In the case of a wireless modem, this typically comprises a short-range wireless transceiver (e.g. Wi-Fi) for accessing the Internet 101 via the wireless access points 106.

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology or Radio Network Controllers (RNCs) in USTM or HSPA terminology.

Each user terminal 102 further comprises a non-volatile memory 213,220 such as an electronic erasable and programmable memory (EEPROM, or "flash" memory) coupled to the processor 211,218. The memory stores communications code arranged to be executed on the processor, and configured so as when executed to engage in communications over the Internet 101 and/or cellular network 103. The communications code may comprise a communication client application for performing communications such as voice or video calls with other user terminals 102 over the Internet 101, via a short-range wireless transceiver 207,216 and wireless access points 106, and/or via a cellular wireless transceiver 207,216, base stations 104 and controller stations 105 of the cellular network 103 as discussed above. However, one or more of the user terminals 102 involved could alternatively communicate via a wired modem, e.g. in the case of a call between a mobile terminal and a desktop PC.

In this manner, a mobile device 102a is arranged to establish a call with another, remote terminal 102b via the Internet 101 (or other packet-based network). In the example shown the remote terminal 102b is a desktop computer, but in other embodiments could be another mobile device.

Particularly, if the video calling feature is enabled by the user, the call comprises a live video call between the mobile device 102a and 102b. The video call comprises an exchange of signals captured in real-time by the devices 102a and 102b, transmitted in the form of IP packets via the Internet 101. The exchanged signals may comprise an incoming video signal from the remote terminal 102b for decoding by the client application on the mobile device 102a and output to the screen 201. The exchanged signals may comprise an outgoing video signal captured by one of the cameras 204 or 205 of the mobile terminal 102 and encoded by the client on the mobile device 102a for transmission to the remote device 102b. The exchanged signals may comprise both incoming and outgoing video signals, although alternatively the video call need not be bidirectional and could comprise video transmitted in only one direction from only one of the user devices 102. The exchanged signals may also comprise an incoming audio signal from the remote device 102b for output via the speaker 203 on the mobile device 102a, and/or an outgoing audio signal captured by the microphone 202 on the mobile device 102a for transmission to the remote device 102b. In the case of a phone call, the audio signals are typically speech signals encoded and decoded according to a suitable speech codec.

As will be familiar to a person skilled in the art, the basic mechanism by which user devices can communicate over a network such as the Internet can be considered as a protocol stack (embodied in the software running on each user device). There are a number of different protocol stacks depending on the communication type, but one is shown in FIG. 3a as representative.

In this stack, the lowest layer is the link layer 316 which is responsible for conveying bits over an RF link between devices 102a and 102b. The link layer 316 is responsible for conveying RF traffic in the form of (typically encoded) bits, modulated onto a carrier frequency.

The internet layer 314 is the packet protocol responsible for immediate packet routing. Those skilled in the art will understand that a packet of data comprises both a header portion and a payload. The header comprises the internetwork address (e.g. IP address) of the destination user device, and the payload comprises the actual user data desired by the communication client application to be transmitted. When a routing node receives a packet, its IP layer software examines the IP address and determines the next adjacent routing node to which to route the packet (or end-user terminal device if the destination device is adjacent).

The transport layer 312 adds additional header information wrapped on top of the IP header to provide services such as port numbering, congestion control and acknowledgement of packet receipt.

Finally, the application layer 310 relates to the user information to be included in the packet payload, e.g. audio or video content of a voice or video call, or user text for an IM message. A client application operating on the application layer 310 is free to include any content it wishes in the payload as appropriate to the application in question.

Figure 3B:
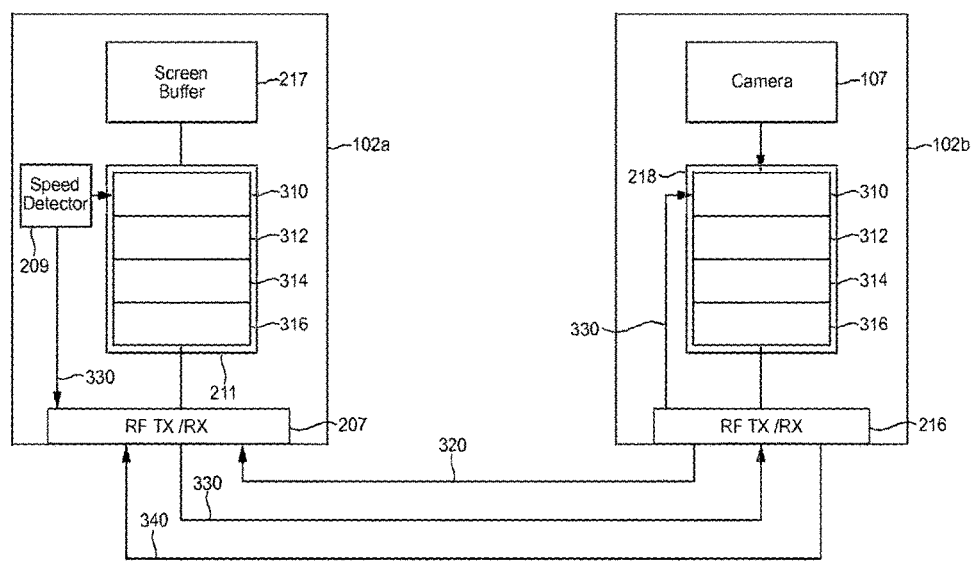
FIG. 3b is a schematic representation of a communication system.

One embodiment will now be described with reference to FIG. 3b. During a video call a video signal 320 is transmitted from the device 102b to the mobile device 102a over a channel established over the network 101. The RF transceiver 207 at the mobile device 102a receives the video signal 320. The processor 211 executes code represented by the protocol stack shown in FIG. 3a. The received video signal 320 is sent up the layers of the protocol stack to the application layer 310, where the client application operates.

The client application running on the processor 211 of the mobile device 102a is configured to detect, based on an input from the speed detector 209, the speed of the mobile 102a. The client application is further configured to limit the amount of information in the received video signal that is sent to screen buffer 217 for outputting to the screen 201 during a video call based on the detected speed of the mobile device 102a. Operations conducted on the transport layer 312 in addition to operations conducted on the application layer 310 may be implemented in order to limit the amount of information in the received video signal.

It is important to note that in this embodiment the amount of information in the video signal 320 that is to be displayed on the screen 201 is only restricted after the video signal 320 has been received by the RF transceiver 207 at the mobile device 102a. That is, as much information in the video signal as is conveyed to the network is received by the RF transceiver 207 at the link layer 316 and supplied to the client application.

As will now be discussed with reference to FIG. 4a, in this embodiment the presentation of video during a video call may be adapted when the mobile device 102a is operating in a "travelling mode".

The operation of the mobile device 102a in the travelling mode is shown in FIG. 4 and commences at node A 401 whereby user 108a of the mobile device 102a is conducting a video call with user 108b of the remote device 102b. At step 402 the speed detector 209 detects the speed of the mobile device 102a and sends the detected speed to the communication client application. This detected speed is then compared to a first predetermined speed threshold at step 403. This first predetermined speed threshold may be for example 30 km/h, those skilled in the art will appreciate that this threshold speed value is merely an example and is not limiting in any way.

If it is determined at step 403 that the detected speed of the mobile device is less than the first predetermined speed threshold then the incoming video signal 320 from remote device 102b is displayed in a conventional manner 404. An example scenario where this may occur is where the user 108a is in a car moving slowly in dense city traffic. In this scenario the user 108a may conduct a video call with user 108b without the video call being a distraction to the user 108a as any changes in the user's environment will occur slowly and the user 108a will be able to concentrate on both the video call and his environment in which he is driving.

If it is determined at step 403 that the detected speed of the mobile device is greater than, or equal to, the first predetermined speed threshold, then the detected speed is compared with a second predetermined speed threshold at step 405. This second predetermined speed threshold may be for example 70 km/h, those skilled in the art will appreciate that this threshold speed value is merely an example and is not limiting in any way. If it is determined at step 405 that the detected speed is greater than, or equal to, the first predetermined speed threshold but less than the second predetermined speed threshold then the display of the incoming video signal 320 from remote device 102b is adjusted at step 406. An example scenario where this may occur is where the user 108a is in a car moving at normal city speeds (30 km/h-69 km/h). In this scenario the user 108a may conduct a video call with user 108b where the video call may become a distraction to the user 108a as the user must concentrate on changes in his environment that are occurring quickly as well as the video call.

At step 406, one or more adjustments may be made to the display of the incoming video signal 320 from remote device 102b to prevent the user 108a becoming distracted. These adjustments to the display of the incoming video signal 320 may include for example dropping video frames such that the video appears to be a sequence of frozen images (i.e. still images); reducing the display size of the video displayed on the screen 201; and reducing the resolution of the incoming video signal.

Furthermore the display of the incoming video signal 320 may be augmented by presenting visual clues (i.e. text or icons) to the user along with the incoming video signal to indicate the travelling mode of operation is active, or adding animation effects (such as blurring or slow motion) to the incoming video signal to show to the user that the change in transmission quality is a conscious decision by the communication client application, not unintentionally caused by technological constraints, such as insufficient device or network resource.

It is important to note that in this embodiment the augmentation of the video signal 320 that is to be displayed on the screen 201 is only implemented after the video signal 320 has been received by the RF transceiver 207 at the mobile device 102a.

If it is determined at step 405 that the detected speed of the mobile device is greater than, or equal to, the second predetermined speed threshold, then the display of the incoming video is stopped at step 407. An example scenario where this may occur is where the user 108a is in a car travelling at high speeds (speeds greater than or equal to 70 km/h). In this scenario if user 108a was to conduct a video call with user 108b the video call would become a distraction to the user 108a as the user would have to concentrate on changes in his environment that are occurring very quickly as well as the video call. Conducting a video call whilst travelling at this high speed is potentially very dangerous therefore the display of the incoming video signal 320 is stopped.

The operations implemented at steps 406 and 407 are temporary operations. It will be appreciated that in a given journey, a user's speed may vary greatly and thus the display of an incoming video signal 320 can be adjusted accordingly. That is, the user 108a may start a journey at low speed (below 30 km/h) and a video call may be displayed in a conventional manner, when the user's speed increases (to between 30 km/h and 69 km/h) an appropriate adjustment may be made to the display of the incoming video signal, and if the user speed was to be equal to or exceed a certain level (greater than 70 km/h) the display of the incoming video signal 320 would be stopped temporarily. When the display of the incoming video signal 320 is stopped, an incoming audio signal from the remote device 102b may still be output via the speaker 203 so that communication between users 108a and 108b can be maintained. If the user 108a's speed drops back down to below 70 km/h the incoming video signal 320 would then be displayed to user 108a, albeit potentially in adjusted form.

Figure 4A:
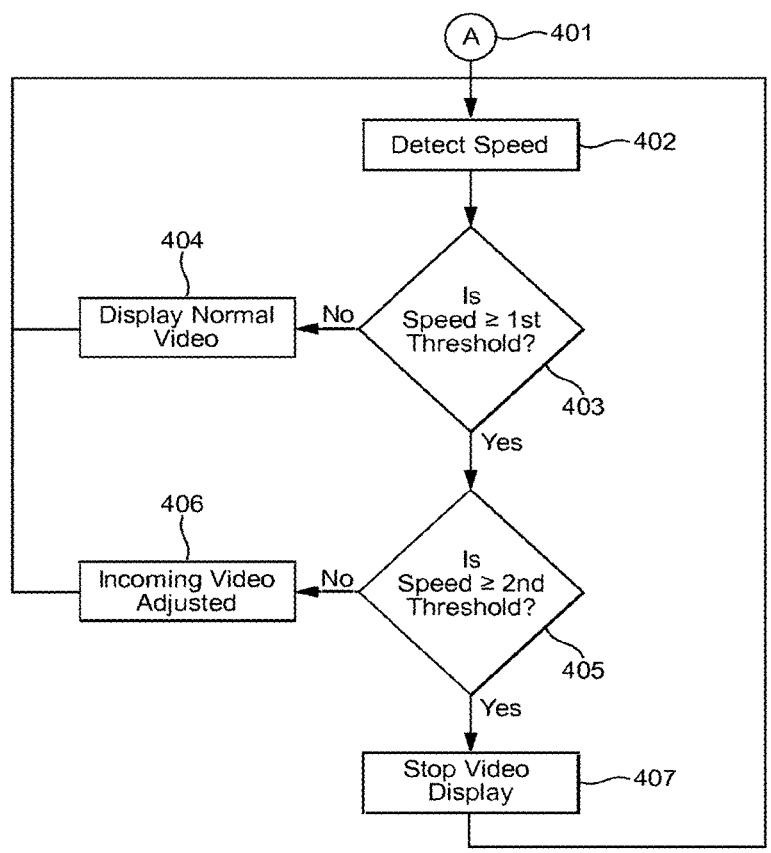
FIG. 4a illustrates a method of controlling the display of an incoming video signal.

Whilst FIG. 4a illustrates two predetermined speed threshold levels for simplicity, it will be appreciated that any number of predetermined speed threshold levels may be used. In the case of using more than two predetermined speed threshold levels, it will be appreciated that one or more adjustments to the incoming video signal 320 may be configured for each threshold level.

Figure 4B:
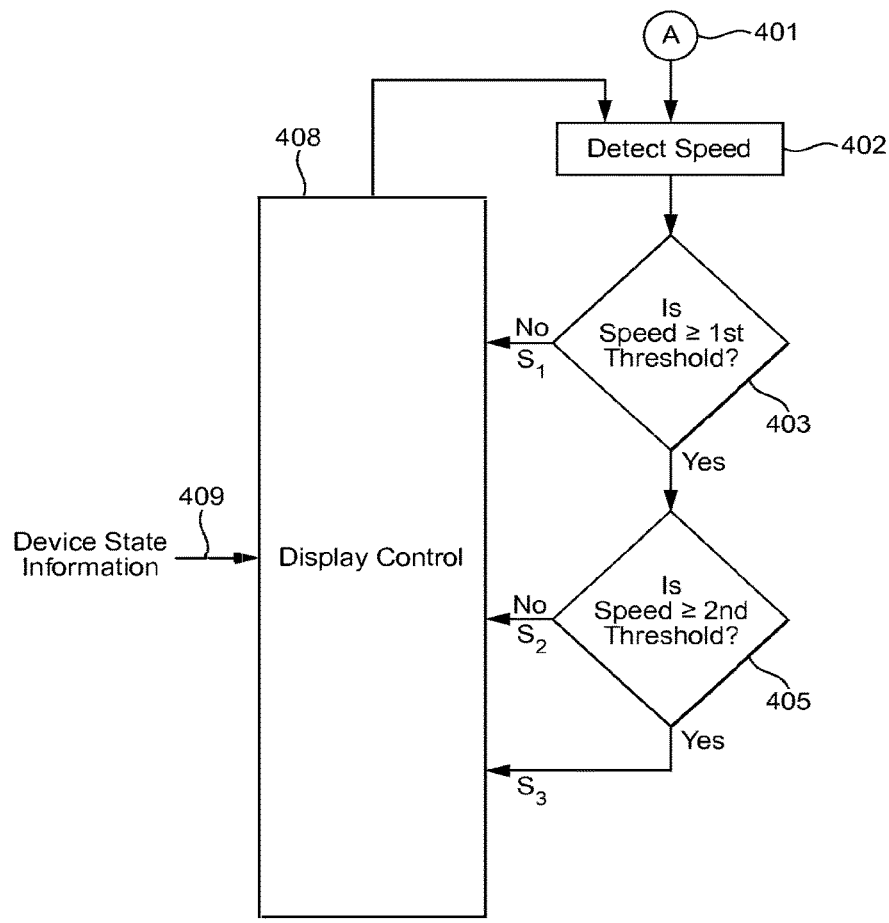
FIG. 4b illustrates another method of controlling the display of an incoming video signal.

In addition to speed detection, the client application running on the processor 211 of the mobile device 102a may be configured to detect additional readings relating to the state of the mobile device 102a based on an input from one or more sensors 215 and control the display of the video call on screen 201 based on the detected speed and the additional readings, this is shown in FIG. 4b.

As shown in FIG. 4b, speed information (S1-S3) determined by steps 403 and 405 is provided to a display control block 408. Using the same example predetermined speed threshold levels as discussed above with reference to FIG. 4a, speed information S1 indicates to the client application that user 108a is travelling below 30 km/h, speed information S2 indicates to the client application that user 108a is travelling between 30 km/h and 69 km/h, and speed information S3 indicates to the client application that user 108a is travelling at a speed that is equal to or exceeds 70 km/h.

These indications of the speed of the mobile device 102a speed information (S1-S3) are supplied to the display control block 408. In addition to these indications of the speed of the mobile device 102a, additional readings relating to the state of the mobile device 102a are supplied to the display control block 408 on line 409. The device state information and the speed information S1-S3 are used by the display control block 408 to determine the most appropriate way of presenting an incoming video signal 320 during a video call.

One or more physical sensors 215 coupled to the processor 211, are used to sense a state of the mobile device 102a and send device state information to the client application running on the processor 211. The device state information may include for example a physical orientation of the mobile device 102a (i.e. whether the device is in a horizontal or vertical position); a vibration level of the mobile device 102a or whether an external hands-free device is connected to the mobile device 102a.

If a user 108a is travelling below the first predetermined speed threshold of 30 km/h and the mobile device 102a is experiencing a high level of vibration, then the display control block 408 may adjust the display of the incoming video signal 320 or indeed stop the display of the incoming video signal 320. This is in contrast to the operation of FIG. 4a where the incoming video signal 320 from remote device 102b is displayed in a conventional manner when user 108a is travelling below the first predetermined speed threshold of 30 km/h. An example scenario of where this may occur is when the user 108a is in a car moving slowly over rough terrain, therefore the user 108a must concentrate on changes in his environment as well as the video call, therefore one or more adjustments may be made to the display of the incoming video signal 320 or the display of the incoming may be stopped to prevent the user 108a becoming distracted.

In another example, if the device state information indicates that the mobile device is in a horizontal position which indicates that the user 108a is not viewing the screen 201 of the mobile device 102a, then the display of the incoming video may be stopped even if the user is travelling at a speed less than the second predetermined speed threshold. This has several advantages including preserving battery life, reducing the cost of the video call if the connection is charged per unit data, and reducing network traffic.

An example method of enabling the mobile device 102a in the travelling mode of operation will now be discussed with reference to FIG. 5a.

When the user 108a of the mobile device 102a receives an incoming video call (step 501) from user 108b the communication client application is arranged to provide user 108a with an option to answer the video call in the travelling mode (step 502). This may be by way of a text-based message displayed on the screen 201 or alternatively an audio message output from speaker 203. The user 108a may respond to this message by making a physical selection by, for example, pressing a button of the mobile device 102a or touching the screen 201 in an appropriate position, or by speaking into microphone 202.

At step 503 it is determined if the user 102a has selected to answer the video call in the travelling mode.

If the user 102a selects not to answer the video call in the travelling mode, it is determined at step 504 whether the user 102a wishes to reject the video call. If it is determined at step 504 that the user 102a wishes to reject the video call the video call is not answered (step 506). If it is determined at step 504 that the user 102a does not wish to reject the video call, the video call is answered at step 505 and will progress as normal.

Figure 5A:
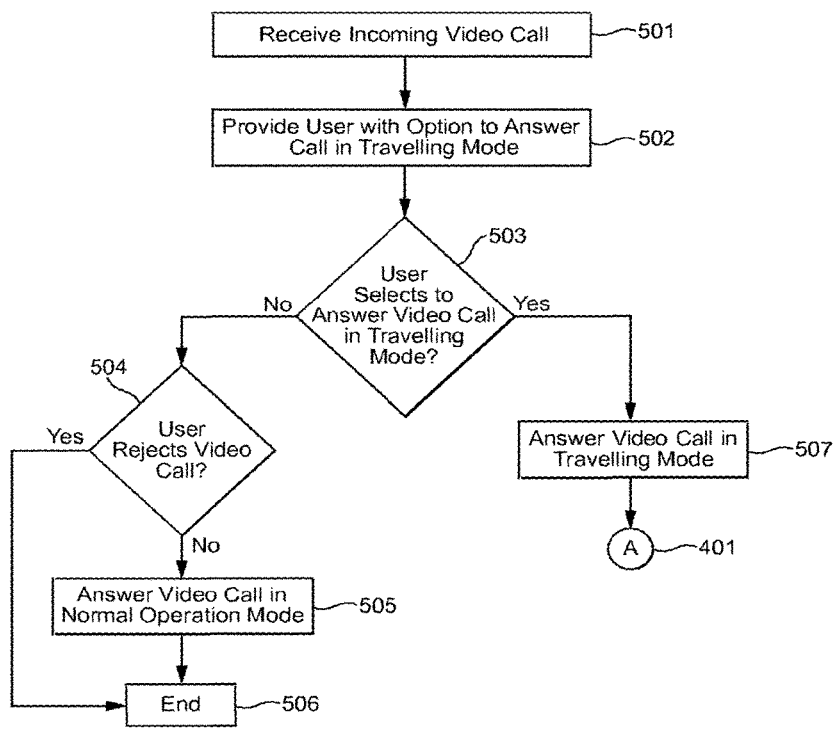
FIG. 5a illustrates a method of presenting a call option.

If the user 102a selects to answer the video call in the travelling mode, then the video call is answered at step 507 and the communication client application operates in the travelling mode during the video call, as illustrated in FIG. 5a by the method proceeding to node A 401 previously shown in FIGS. 4a and 4b.

The travelling mode option 502 may only be presented to the user 108a if it is detected that the user 108a is travelling above a predetermined speed threshold associated with the travelling mode of operation. This method of enabling the mobile device 102a in the travelling mode of operation will now be discussed with reference to FIG. 5b.

Figure 5B:
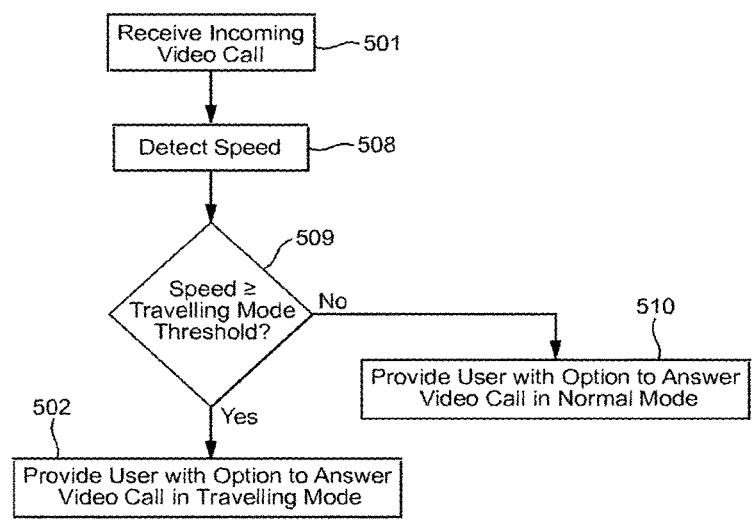
FIG. 5b illustrates another method of presenting a call option.

As shown in FIG. 5b, when an incoming video call is received, instead of immediately proceeding to step 502 (shown in FIG. 5a) of providing user 108a with an option to answer the video call in the travelling mode, the speed detector 209 detects the speed of the mobile device 102a (step 508). The speed of the mobile device 102a is then compared, at step 509, to a predetermined speed threshold associated with the travelling mode of operation.

If the speed of the mobile device 102a is greater than or equal to the predetermined speed threshold associated with the travelling mode of operation then the user 102a is provided with an option to answer the video call in the travelling mode. However if the speed of the mobile device 102a is less than the predetermined speed threshold associated with the travelling mode of operation then the user 102a is provided with an option to answer the video call in a normal mode of operation (step 510). It will be appreciated that the user may then select to answer the video call in the normal mode of operation or reject the video call. The predetermined speed threshold associated with the travelling mode of operation may be for example 5 km/h, those skilled in the art will appreciate that this threshold speed value is merely an example and is not limiting in any way.

Figure 6:
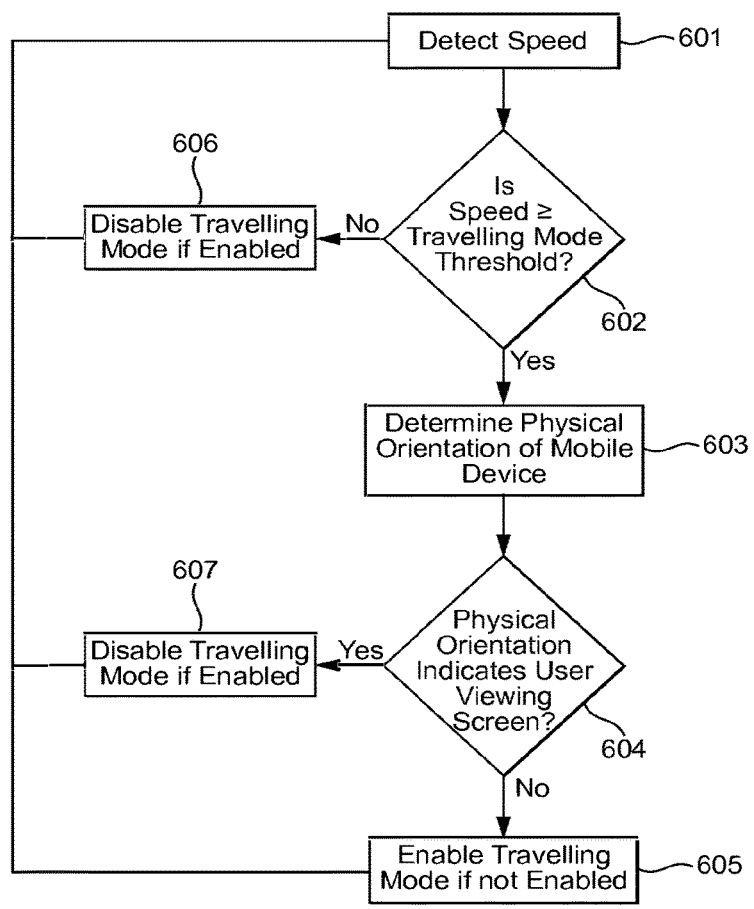
FIG. 6 illustrates a method of enabling a mode of operation of a mobile terminal.

Another example method of enabling the mobile device 102a in the travelling mode of operation will now be discussed with reference to FIG. 6.

At step 601, the speed detector 209 detects the speed of the mobile device 102a. The speed of the mobile device 102a is then compared, at step 602, to a predetermined speed threshold associated with the travelling mode of operation. If the speed of the mobile device 102a is not greater than or equal to the predetermined speed threshold associated with the travelling mode of operation, then the travelling mode is disabled at step 606 if the travelling mode of operation has already been enabled. If the speed of the mobile device 102a is greater than or equal to the predetermined speed threshold associated with the travelling mode of operation, then the physical orientation of the mobile device 102a is determined at step 603.

At step 604, it is determined whether the physical orientation of the mobile device 102a indicates that the user 108a is viewing the screen 201. If the physical orientation of the mobile device 102a indicates that the user 108a is viewing the screen 201, then the travelling mode is disabled at step 607 if the travelling mode of operation has already been enabled.

If the physical orientation of the mobile device 102a indicates that the user 108a is not viewing the screen 201 (for example the mobile device is lying horizontally with the screen 201 faced up), then the travelling mode of operation is enabled at step 605. Thus the display of the incoming video signal 320 is only adjusted or stopped when the user 108a is not viewing the screen; advantages of this have been previously described with reference to FIG. 4b.

It will be appreciated that it may be difficult to determine that the physical orientation of the mobile device 102a indicates that the user 108a is viewing the screen 201. For example the mobile device 102a may be being used by a passenger in a car or by a user seated on a moving train and it is therefore safe to display video without enabling the travelling mode.

If it is determined that the user 108a is not viewing the screen 201 at step 604, a message may be displayed (step not shown in FIG. 6) on screen 201 before enabling the travelling mode at step 605 to warn the user that the mobile device is going to enable the travelling mode and provide an option to prevent the mobile device from entering the travelling mode. If the mobile device 102a has received no user input after a certain period of time has elapsed following the display of the message (indicating that the user 108a is not viewing the screen 201) then the method proceeds to step 605. However if the mobile device 102a receives a user input responsive to displaying this message the method proceeds to step 607 where the travelling mode of operation is disabled if it has already been enabled.

Alternatively, if it is determined that the user 108a is not viewing the screen 201 at step 604, a message may be displayed (step not shown in FIG. 6) on screen 201 after enabling the travelling mode at step 605 to advise that the mobile device has entered the travelling mode and provide an option to disable the travelling mode. If the mobile device 102a has received no user input after a certain period of time has elapsed following the display of the message (indicating that the user 108a is not viewing the screen 201) then the travelling mode remains enabled and the method proceeds to step 601. However if the mobile device 102a receives a user input responsive to displaying this message the method proceeds to step 607 where the travelling mode of operation is disabled.

In the above described embodiment, the methods of controlling the display of the incoming video signal 320 are implemented by a communication client application executed on a processor 211 of the mobile device 102a after the incoming video signal has been received.

An alternative embodiment will now be described referring back to FIG. 3b.

In this alternative embodiment, if the travelling mode has been enabled on the mobile device 102a (as discussed with reference to FIGS. 5a, 5b, and 6) the methods of controlling the display of a video signal displayed on screen 201 of the mobile device 102a are implemented by a communication client application executed on a processor of the remote device 102b before the video signal is transmitted to the mobile device 102a.

In this alternative embodiment the speed detector 209 detects the speed of the mobile device 102a and instead of sending the detected speed to the communication client application executed on a processor 211 of the mobile device 102a, the detected speed 330 is sent to transceiver 207 so that it can be transmitted via the channel established over the network 101 to the remote device 102b.

Additional information relating to the state of the mobile device 102a based on an input from one or more sensors 215 may also be sent via the channel established over the network 101 to the remote device 102b. Examples of device state information have been discussed previously with reference to FIG. 4b.

The transceiver 216 at the remote device 102b is configured to receive the detected speed 330 (and optionally the device state information).

The processor 218 at the remote device 102b executes code represented by the protocol stack shown in FIG. 3a. The detected speed 330 is sent to the application layer 310 of the protocol stack where a client application operates.

During a video call, camera 107 at the remote device 102b is configured to capture video data and send the video data to the client application executed at the remote device 102b. The client application running on the processor 218 of the remote device 102b is configured to receive the detected speed 330 of the mobile device 102a. The client application is further configured to limit the amount of information in transmitted video signal 340 that is transmitted from transceiver 216 during a video call based on the detected speed of the mobile device 102a.

It is important to note that in this alternative embodiment the amount of information in the video signal 340 that is to be displayed on the screen 201 is restricted (if required) before the video signal 340 is supplied to the RF transceiver 216 at the remote device 102b for transmission over the network. This has the additional advantage that network bandwidth is conserved in travelling mode. When received, all the (restricted) information in the video signal is played out at the screen 201.

It will be appreciated that in this alternative embodiment, the threshold levels as shown in FIGS. 4a and 4b may be used by the client application executed at the remote device 102b to determine whether the information in video signal 340 is to be restricted, and if the information in video signal 340 is to be restricted, by what degree.

In this alternative embodiment, the remote device 102b may become aware that it is to limit the transmitted video 340 (if required) responsive to receiving a message received from the mobile device 102a that is sent via the channel established over the network 101. This information may be signaled prior to the video call being answered, such as during call set up or using presence information.

There may be a certain degree of overlap between the two embodiments described hereinabove. For example, if during a video call mobile device 102a reaches a certain speed threshold, the detected speed 330 can be transmitted via the channel established over the network 101 to the remote device 102b. As described above, the client application running on the processor 218 of the remote device 102b is configured to receive the detected speed 330 of the mobile device 102a and limit the amount of information in the transmitted video signal 340 that is transmitted from transceiver 216 as appropriate. It will be appreciated that there will be a period of time when the mobile device 102a will receive incoming video signal 340 (that has not been limited in any way) prior to the client application executed on remote device 102b limiting the transmitted video 340 (if required). Therefore, the client application running on the processor 211 of the mobile device 102a may be configured to immediately limit the amount of information in the received video signal 340 (that has not been limited in any way) based on the detected speed of the mobile device 102a.

It will be appreciated that in both embodiments discussed hereinabove, the speed of the mobile device 102a is initially detected by speed detector 209. The speed detector may comprise a global positioning system (GPS) module to determine the speed of mobile device 102a. Alternatively the speed of the mobile device 102a may be determined by taking a direct speed measurement if the mobile device is connected to, or integrated entirely into, a vehicle such that the mobile device has access to the vehicle's metrics.

It should be understood that the block and flow diagrams may include more or fewer elements, be arranged differently, or be represented differently. It should be understood that implementation may dictate the block and flow diagrams and the number of block and flow diagrams illustrating the execution of the embodiments. It should be understood that elements of the block and flow diagrams described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with reference to preferred embodiments, it will be understood to those skilled in the art that various changes in form and detail may be made without departing from the scope of the invention as defined by the appendant claims.

The invention claimed is:

1. A method of displaying a video image at a mobile device during a video call over a wireless communication network, the method comprising:
   detecting a speed of the mobile device;
   responsive to the detecting, sending an indication of the detected speed to a communication client application that is conducting the video call on the mobile device; and
   responsive to receiving the indication, the communication client limiting an amount of information from a received video signal that is supplied for display on a display of the mobile device during the video call.

2. The method of claim 1, wherein the communication client limits the amount of information by dropping video frames of the received video signal, reducing the display size of the video information that is supplied to the display, or reducing the resolution of the video information that is supplied to the display.

3. The method of claim 1, wherein the communication client application is configured to generate an indication in the display to notify a viewer that information in the received video signal has been limited.

4. The method of claim 3, wherein the displayed indication adjusts the image by adding animation effects to the received video signal or adding visual text and/or icons to the received video signal.

5. The method of claim 1, wherein the communication client limits the amount of the information if the indicated speed satisfies a first condition.

6. The method of claim 5, wherein, if the indicated speed satisfied a second condition, the communication client is configured to prevent the display of any information from the received video and limit the amount of information from the received video signal that is supplied for display on the display of the mobile device during the video call.

7. The method of claim 1, the method further comprising:
   the communication client application receiving state information of the mobile device, the state information used in addition to the indication of the determined speed to limit the amount of information in the received video signal that is supplied to the display.

8. The method of claim 7 wherein the state information of the mobile device includes at least one of a physical orientation of the mobile device, a vibration level of the mobile device, or whether an external hands free device is connected to the mobile device.

9. The method of claim 1, the method further comprising the communication client application:
receiving a notification of a travelling mode of operation; and
limiting the amount of information from the received video signal that is supplied for display during the travelling mode of operation.

10. The method of claim 9, further comprising the communication client application:
receiving the notification of the travelling mode in response to a user of the mobile device selecting the travelling mode of operation; and
presenting an option to answer the video call in the travelling mode to the user of the mobile device.

11. The method of claim 10, wherein the option to answer the video call in the travelling mode is presented to the user of the mobile device if the indicated speed of the mobile device is above a speed threshold associated with the travelling mode.

12. The method of claim 9, further comprising:
sensing a physical orientation of the mobile device; and
enabling the travelling mode in response to the indicated speed of the mobile device being above a speed threshold associated with the travelling mode and the sensed physical orientation of the mobile device indicating that the user of the mobile device is not viewing the screen.

13. The method of claim 1, further comprising:
executing the communication client application in an application layer on a processor at the mobile device; and
receiving a video signal comprising the streaming video over a channel of the wireless communication network at a link layer of the mobile device.

14. The method of claim 1, further comprising:
executing the communication client application on a communication processing apparatus at a remote device;
sending the indication of the detected speed from the mobile device to the communication client application; and
limiting the amount of information in the video signal at the communication client application at the remote device prior to transmission to the mobile device.

15. The method of claim 1, wherein the detecting the speed of the mobile device is performed by a speed detector at the mobile device.

16. The method of claim 1, wherein the speed detector comprises a Global Positioning System (GPS) module.

17. The method of claim 1, wherein the video call is an Internet protocol-based video call.

18. A mobile device comprising:
wireless access circuitry configured to access a wireless communication network;
a display;
a speed detector configured to detect a speed of the mobile device;
a processor configured to execute a communication client application to perform operations comprising:
conducting a video call with a remote device via a channel established over the wireless communication network:
receiving a video signal transmitted over the channel from the remote device;
displaying the video signal on the display in the form of a video image;
receiving an indication of the detected speed from the speed detector;
responsive to receiving the indication of the detected speed, limiting the amount of information in the received video signal prior to display on the display during the video call.

19. The mobile device of claim 18, wherein the communication client limits the amount of the information if the indicated speed satisfies a first condition.

20. A mobile device comprising:
wireless access circuitry configured to access a wireless communication network;
a display;
a speed detector configured to detect a speed of the mobile device;
a processor configured to execute a communication client application to perform operations comprising:
conducting a video call with a remote device via a channel established over the wireless communication network;
receiving an indication of the detected speed from the speed detector;
responsive to receiving the indication, transmitting the indication of the detected speed to the remote device over the channel; and
supplying, to the display, a streaming video image comprising information in a video signal received via the channel without limiting the information supplied to the display.

* * * * *